United States Patent [19]

Fujimoto

[11] Patent Number: 5,028,361
[45] Date of Patent: Jul. 2, 1991

[54] METHOD FOR MOLDING A PHOTOSENSITIVE COMPOSITION

[76] Inventor: Takeo Fujimoto, 2-17, 1-chome, Sonhigashimachi, Toyonaka-shi, Osaka, Japan

[21] Appl. No.: 267,181

[22] Filed: Nov. 4, 1988

[30] Foreign Application Priority Data

Nov. 9, 1987 [JP] Japan .................................. 62-282666
Dec. 28, 1987 [JP] Japan .................................. 62-335144

[51] Int. Cl.⁵ .................................................. B29C 35/10
[52] U.S. Cl. ........................................ 264/22; 264/171; 264/175; 264/236; 264/331.18; 264/347; 425/174.4
[58] Field of Search ............... 264/22, 27, 171, 175, 264/331.18, 85, 236, 347; 425/174.8 R, 174.4, 174

[56] References Cited

U.S. PATENT DOCUMENTS

| | | | |
|---|---|---|---|
| 2,607,081 | 8/1952 | Taylor | 264/85 |
| 3,658,620 | 4/1972 | Hale | 264/22 |
| 3,713,935 | 1/1973 | Grecchi | 264/22 |
| 3,796,786 | 3/1974 | Koch et al. | 264/331.18 |
| 4,042,654 | 8/1977 | Leszyk et al. | 264/22 |
| 4,294,782 | 10/1981 | Froehlig | 264/22 |
| 4,407,646 | 10/1983 | Bricot et al. | 425/174.4 |

FOREIGN PATENT DOCUMENTS

| | | | |
|---|---|---|---|
| 56-126132 | 10/1981 | Japan | 264/27 |
| 59-179317 | 10/1984 | Japan | 264/22 |
| 62-19432 | 1/1987 | Japan | 264/22 |

*Primary Examiner*—Jeffery Thurlow
*Attorney, Agent, or Firm*—Darby & Darby

[57] ABSTRACT

A photosensitive composition wherein setting is retarded in the presence of air is subjected to partial setting by directing radiating light through the side in contact with air, thus setting the opposite side which is not in contact with air, with setting then completed by directing radiating light to the unset part of the composition in the absence of air. The composition is extended on a metal surface, with the surface in contact with the metal being subjected to setting, thus providing excellent smoothness. After the unset part of the composition is stuck by pressure to another unset composition or another film, the films can be adhered with radiating light. When metal rolls are utilized for the metal surfaces, continuous manufacturing can be easily achieved.

18 Claims, 10 Drawing Sheets

METHOD FOR MOLDING A PHOTOSENSITIVE COMPOSITION

BACKGROUND OF THE INVENTION

The present invention relates to methods for molding a photosensitive composition. The molding methods include molding into a sheet-shape, laminating and sandwiching material between films.

Although there are various methods for molding plastic, the object of the invention is to improve the above-mentioned three methods. In the following, these methods are described in separated paragraphs.

CONVENTIONAL METHODS FOR MOLDING INTO A SHEET-SHAPE

The methods for molding plastic into a sheet-shape, hitherto, included various methods as follows. A sheet as used herein as a concept includes a film, with generally 0.1 mm or more in thickness being a sheet and less than 0.1 mm being a film.

(1) Extrusion Molding Method

Generally, a thermoplastic resin is melted by heating, extruded from a wide so-called T-die having a narrow slit, and set by cooling with pressing down to a cooling roll. This method is sometimes referred to as a casting method.

Also an inflation method is used, wherein a melted plastic resin is extruded from a ring-shaped gap, formed into a bulb-shape by blowing air from the ring center, and formed into a sheet-shape by folding it.

Particularly, the casting method using a T-die has a large advantage in extruding methods in being capable of producing precise sheets in large capacity, hence it is the most popular molding method as a means for molding a heat plastic resin into a sheet-shape.

(2) Solution slavering method (casting method)

In this method, a plastic is dissolved in a solvent, the solution (referred to as dope) is supplied to a hopper, slavered on a metal drum or metal belt from a small gap at the bottom of a hopper, and sheets are solidified by evaporating the solvent. As the drum or belt rotates, the sheets are peeled off from the metal surface.

The method has remarkable characteristic features as the sheet surface is very smooth and has an excellent gloss because it is solidified in contact with the metal surface which is kept smooth by polishing and there is very little deviation in sheet length and breadth. Also as to accuracy in thickness, this method is said to maintain the accuracy better than any of the other process. The film in the photograph is produced by this method using cellulose acetate.

(3) Calender processing method

In this method, a thermoplastic resin is supplied between heated multistep rolls, kneading with mixing is repeated, and the melted resin introduced between two rolls to decide the thickness, with the sheets produced by cooling-solidifying.

By this method, wide sheets can be produced with high efficiency. The most popular plastic sheets produced by the method are soft and hard polyvinylchloride sheets.

CONVENTIONAL METHOD FOR LAMINATING

In combining by laminating a plastic film, there are cases wherein a plastic film coating is stuck to the surface of a substrate or two substrates A and B are stuck together via an adhesive layer, (laminate). Recently, with the progress of a film molding by extruding molding methods, there has been a method wherein two types of thermoplastic resin of A and B are extruded at the same time and the resins are bonded together with melting into a laminate before being taken out of the mold. As substrates, usable are plastic films, paper, metal foil and fabrics, and so forth. As the adhesive layer, besides various adhesives used as adhesives in themselves, plastic film itself may function as an adhesive as shown in the extrusion laminate method. In either case, there are means used for supplying a further high functional film material by synthesizing. Here a laminated state attained by any method is referred to as a laminate.

Further, substrates such as sheets and films, include various shapes of thin materials which are put between plural sheets or films to form a sandwich-shape, which are covered by the term laminate as used in this specification. The thin materials are not limited to plastics, and include all materials of small thickness, such as fabrics, knitted goods, pressed flowers, butterfly specimens and leaves of wood or bamboo. Further, they include materials not necessarily known as thin materials generally such as powder and particles. After all, thin materials are not limited to any species if they are materials which can be put between plastics or sheets as a continuous or noncontinuous layer-shape.

Concerning the necessity for laminates, in the various fields of industrial materials, they have been required to have higher-lever performance characteristics, which cannot be met by the performance characteristics of single plastic material in many cases.

The fields wherein laminates products are used in large amount in places attracting public notice are individual packages of foodstuffs or medical supplies, and magnetic cards. Further, various building materials, interior materials of automobiles, stationeries, sundries, various household electric appliances, and other goods which are inconspicuous, but when these are included, laminate products can be said to be supplied for more and more diversified uses.

The production method for such laminate products are as follows.

(1) Extrusion laminate method (including Coextrusion)

This method is used most. As substrates, there may be mentioned cellophane, various plastic films, metal foil and fabrics, and so forth. However, most of the laminate materials are polyethylene, and as the other materials, ethylene-vinyl acetate copolymer and polypropylene are used according to the objectives. Further, as the other methods, two or more coating heads are provided to laminate multi-layers at one time, or by extruding melted resin film of two or more layers from one mold at the same time, namely coextrusion, producing laminates on substrates. In laminating on plastic film or metal foil, usually a primer coating is applied on substrates before a melted resin is laminated to increase adhesion.

In this method, the sorts of substrates are abundant and as described above multi-layers can be laminated at one time, hence it is used for many objects. For instance, in films used for preserving foodstuffs, to secure desirable effects of contents, preserving performance, heat resistance to withstand heat sterilization and heat-seal property in automatic package, a one layer film is not sufficient but at least two or more layers films are generally used. In such a case, the extrusion laminate method is most generally used.

(2) Dry laminate method

Also in this method, two types of substrates of A and B are stuck together by adhesives. The adhesives are of a reaction type generally. Recently, an ordinary temperature setting type has been used. As the method, an adhesive is applied on either substrate of A or B, solvent is evaporated if solvent is used, an appropriate adhesive surface in an unsetting state is formed, and another substrate is stuck to the first substrate. In an adhesive wherein solvent is not used, so-called nonsolvent type, the drying process is eliminated. In any case, after sticking together, normal aging is performed for about 24 hours to complete setting. In this method, the laminates of various plastics to each other or of plastics and metal foil can be made. As adhesives, there may be mentioned vinyl, cellulosic and epoxy type, that are selected according to the sorts of substrates or to the objects. This method is popular next to the extrusion laminate method, being often used for the laminates of substrates to each other which is impossible in extrusion laminate.

(3) Hot-melt laminate method

In this method, plastics film, aluminum foil and paper are stuck together with polyethylene (copolymer with vinyl acetate) of low molecular weight or wax melted by heating and cooled. Also so-called coating films are used wherein hot-melt materials are applied to substrates produced in this process.

As adhesives, a mixture of paraffin wax and microcrystal wax were used, but recently ethylene vinylacetate copolymer, ethylene acrylic acid ester copolymer or the like has been used.

According to the method, complex films having an appropriate moisture protecting effect can be produced at a relatively low cost, hence the films are used as packages for confectioneries and snack foodstuffs.

(4) Wet laminate method

In this method, an adhesive is applied to a plastic film or metal foil, immediately, for example, a substrate easy to adsorb moisture such as paper is stuck to it, and moisture is evaporated to complete adhesion. As adhesives, usable are water-soluble starch, polyvinyl alcohol, and emulsion of polyvinylacetate or polyvinylchloride. As a typical example, there is a complex composition of aluminum foil and fine paper used as an inlined material of a tobacco case.

The problems of the above-mentioned conventional techniques are described in the following.

First, the conventional method of molding into a sheet-shape has the following defects.

In the extrusion molding method (1), those thermoplastic resins requiring a large amount of energy are melted by adding further heat energy. Further, a strain which is unstable to heat is inevitably generated in the sheet during heat molding, but it is difficult to relieve perfectly even if the sheet is annealed, hence the sheet is unsuitable for these uses wherein the size stability when heated is required.

Further, since the uniformity of sheet thickness and the smoothness of surface are inferior to those according to the solution slavering method, the extrusion molding method is unsuitable for the producing of goods wherein these properties are severely required, for example a photographic film.

In the solution slavering method (2), the sheeting equipment to produce sheets of high accuracy requires a very high cost, and the synthetic equipment investment is quite high if the solvent recovering equipment and safety devices are included. In addition, the cost of the equipment increases with efforts to increase the production speed, leading to the very high production cost. The plastics as the object of sheet formation according to the method are limited, and in the present state cellulose acetate occupies the greater part, there being only a part of polyvinylchloride sheet and some examples such as polyvinyl alcohol and polycarbonate. In the method, the molding of a very thin or thick sheet is difficult, being moldable only in the range of 50~300 $\mu$ at best.

In the calender molding method(3), the object materials are limited so that it is said that the object in thermoplastic resins is only soft and hard polyvinylchloride. This molding method is a process wherein a large amount of energy is consumed similarly to the extrusion molding method, but the productivity is higher and the additional amount of processing auxiliaries such as stabilizers is smaller, leading to a lower cost, than the extrusion molding method. Although it is an advantage over that method, the quality and the small lot-size copying with multi-sort products are inferior to those of the polyvinylchloride sheet according to the extrusion molding method.

From the present state, the film, for example photographic film, excellent in the surface gloss and smoothness and having high uniformity without foreign matters has been inevitably molded by the solution slavering method. Therefore, the development of the process wherein products of such high quality can be produced in the lower cost with high efficiency, safety and a wide application scope by overcoming the effects of conventional processes has been strongly desired in this industry.

In the following, the defects of the conventional laminate method are described.

The extrusion laminate method (1) is as mentioned above very popular because of the wide selectable scope of substrates. However, substrates sensitive to heat are unusable. For laminate materials, thermoplastic resins capable of extrusion molding are required where used in the coextrusion technique conditions must be achieved which permit adhesion of two types of resin A and B. If the extrusion equipment for melting each resin is set up, even if a multilayer laminate can be molded at the same time, the construction area becomes large and a large scale equipment is needed, leading to a high cost for the equipment.

Further, when the extrusion equipment steps, the unusable resin remains in the extrusion machine, leading to a waste of materials.

Also in the dry laminate method (2, where an adhesive of solvent type is used, a drier for the solvent is needed and the substrates are exposed to high temperature. Accordingly, also in this case, substrates sensitive to heat must be avoided. Further, until perfect adhesion is achieved, aging is needed which takes time. From these circumstances, making a multilayer at the same time is very difficult.

In the hot-melt laminate method (3), the laminate material itself has a low melting point, that is, is sensitive to heat, hence the method has a defect that it is unsuitable for producing laminates requiring heat resistance.

The wet laminate method (4) is used in the limited scope that at least one of the substrates is limited to paper or cloth absorbing water, and the limitation itself is said to be the defect.

As mentioned above, synthetically, in laminates according to the conventional method, substrates used play a principal part at the surface layer with an exception. The exception is a case wherein a melted resin for extrusion directly contacts the surface of a metal roll (casting) forming the surface layer as observed in films by the extrusion coating or coextrusion method (including the use in extrusion coating) or sheet molding. Also in this case, the better surface properties than those obtained by extrusion molding can not be obtained. Hence, in the smoothness and uniformity of film and occurrence of foreign matters such as fish-eye, the film surface states as obtained by the solution slavering method can not be formed.

This means that, in fields wherein recently the smoothness of plastic film surface and uniformity of film are strictly required, the complex films obtained by the conventional technique are unusable. Further, when the films obtained by the solution slavering method are used as substrates, a large rise in the prices of products is brought about.

Further, as common problems, with the properties of substrates, a deformation such as curl tends to occur at various states by various causes such as the effect o moisture content or the shrinkage due to heat in lamination. The production of films without deformation such as curl is very difficult to achieve by any of the conventional methods.

SUMMARY OF THE INVENTION

The objects of the invention is to solve the above-mentioned problems and the invention has a great feature in the partial setting of a photosensitive composition. The invention has developed an epoch-making process for producing sheets by the application of a photosensitive composition as a method without the use of heat and solvent. As a key point of the invention, the prevention (retard) of setting (curing) by air (oxygen), which has been the largest source of defects of photosensitive compositions, was utilized conversely. According to the invention, a photosensitive composition whose setting is prevented by air is extended on a metal surface, the composition side contacting with the metal surface is subjected to setting by radiating light from an opposite side of the metal surface, then air is shut off and the composition is completely set by radiating light. Accordingly, after light radiation, the sheet having an unset surface contacting with air is peeled off from the metal surface and (1) the unset part is stuck to the metal surface and light is radiated from the set surface, or
(2) the unset part is stuck by pressure together with the unset part of another sheet having an unset surface peeled off from a metal surface in the same manner to unify, or
(3) the unset part is stuck to an other film by pressure, or (4) the sheet is stuck to a thin material placed between films, which are stuck together by pressure, then, when light is radiated from both side, the unset side is completely set because air is not present.

Thus, the invention utilizes conversely the prevention of setting due to air which was originally a serious defect of a photosensitive composition, which is a new idea not thought of hitherto. To prevent setting due to air, hitherto, an atmosphere of inert gas such as nitrogen or a film-cover was adopted.

DETAILED DESCRIPTION OF THE INVENTION

Figure 2:
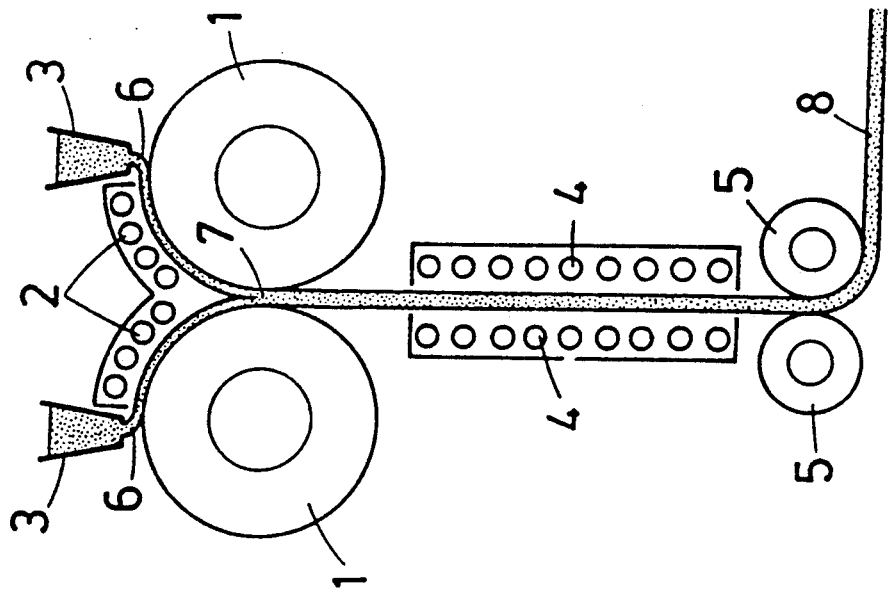
FIG. 2 is a rough section showing an example of the molding method (sheet formation) of the invention.

In the following the invention will be described further in detail.

First, a sheet molding method as a state of the invention is described.

The invention is a method for sheet formation (film formation) of plastics comprising developing a photosensitive composition wherein setting is prevented in the presence of air on a metal surface, setting the side contacting with the metal surface by radiating light from the opposite side to the metal surface, and then completely setting the composition by radiating with light again in the absence of air.

The photosensitive composition refers to a composition set by radiating light. It is not specially material limited and all of the photosensitive compositions are applicable. The setting is required to be prevented in the presence of air (oxygen). Since the setting is usually prevented in the presence of air with exception, there is no problem. The viscosity of the composition is also not specially limited if it can be extended.

The photosensitive composition including not only monomer but oligomer and prepolymer is not limited to any particular species if it is set by radiating light. Generally, a monomer having a functional group such as an acryloyl group or an allyl group is used.

As examples, there may be mentioned HEMA (2-hydroxyethylmethacrylate), N-methylacrylamide, acrylic acid, methacrylic acid, diethylaminoethyl (meth)acrylate, diethyleneglycol di(meth)acrylate and methylol(meth)acrylamide.

Further, the composition is not required to be a single substance, but it may be a mixture of various photosensitive compositions.

The compositions may be formed as an odor emitting plastic film(sheet) by mixing with perfumes. Particularly, a mixture of a volatile perfume is hopeful, which could not be blended owing to the problem of the molding temperature hitherto.

High polymers may be mixed with the photosensitive composition. The high polymers are not required to be dissolved in the photosensitive composition, but if they can be dispersed in the composition or can be kneaded with the composition, they are usable. Further, a photoinitiator to be mixed usually (for example, benzil and AIBN, not required for electronic rays setting) or the other materials may be freely added of course.

As high polymers mixed, for example, there may be mentioned polyacrylic acid ester, polyvinylbutyral, polyvinyl acetate and polyamide. For instance, N-methyoxy-6-Nylon forms a transparent set film suitable for sheet molding. The mixing ratio is varied with the sorts of the monomer and high polymer and it may be selected properly.

For example, a mixture of the monomer of 70% and polymer of 30% is used. As an example, there may be mentioned a mixture of 20 parts by weight of N-methoxymethylpolyamide resin wherein 30% of polyamide groups were subjected to methoxymethylation, 80 parts by weight of hydroxyethyl methacrylate and 1 part by weight of a photoinitiator.

The metal surface refers to a metal surface finished to have a surface smooth. The form including plate-, belt-, and roll-shape is not specially limited. The degree of smoothness depends upon the accuracy required for the molded sheet, and usually the smoothness of the same degree as the metal roll in the conventional solution slavering method is preferable. As the metal material, chromium, nickel or stainless steel is appropriate.

The metal roll refers to a cylinder-shaped drum having a metal surface.

The extending refers to placing, with slavering, a composition on a roll. Usually the composition is discharged from a narrow slit-shaped introducing opening. A hopper used in the slavering molding of cellulose acetate and a comma-coater adopted to thick coating are appropriate.

The opposite side to a metal surface(or metal roll) is a direction to radiate light to the extended composition not from the metal side but from the composition side extended on the metal surface. Of course, radiation from a perfect right angle is not required.

Light generally refers to ultraviolet rays as a rule, but the other light utilizable for setting such as electronic rays or visible rays is also usable. Ultraviolet rays used for general photosetting may be used and a special irradiation equipment is not required.

The method can be executed because, when light was radiated to a photosensitive composition, the surface side contacting with air is subjected to very slow setting owing to the prevention to setting due to air while the metal surface side is subjected to fast setting with the effect of the reflected light.

Figure 1:
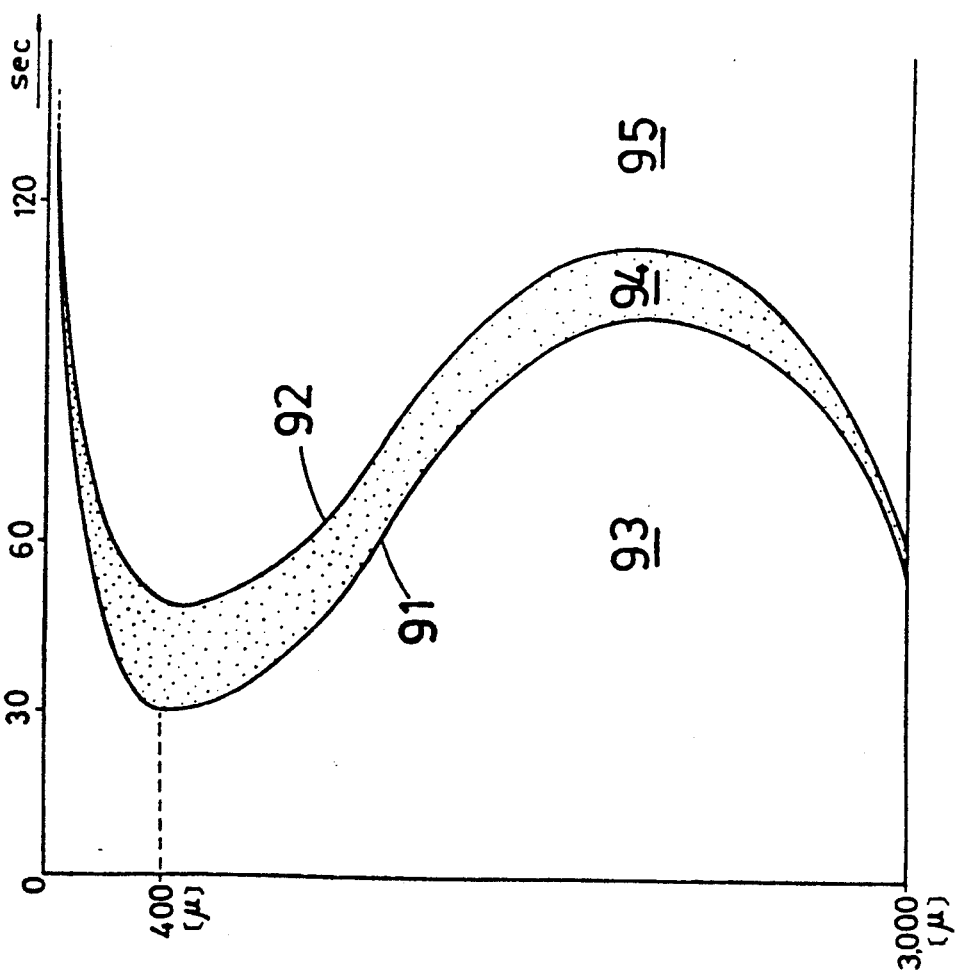
FIG. 1 is a graph showing a setting state.

FIG. 1 shows the results of experiments by the inventors. In FIG. 1, the abscissa is a time (second) and the ordinate is the thickness of the composition extended. The thickness of the composition extended in the case is 3000 $\mu$. Consequently, the point of thickness 0 is the side contacting with air and the point of thickness 3000 $\mu$ is the side contacting with a metal roll. A curve (91) is a gelation curve and a curve (92) is a setting curve. In this example, the part of about 400 $\mu$ from the surface was most rapidly (about 30 seconds) subjected to gelation and setting. Then, gelation progressed to the upper and lower direction of the layer, after about 60 seconds gelation and setting started from the metal surface, and in less than about 120 seconds the composition was completely set with remaining about 20 $\mu$ of the surface layer. (93) in FIG. 1 shows a solution state, (94) gel state and (95) solid.

Thus, in the state exposed in air the part of a certain thickness from the surface is not set (or very slow setting), hence the method of the invention can be executed.

There are two types in the method of the invention and each method is described in the following.

In the first method, two metal roll are closely arranged, photosensitive compositions are extended on the rolls, light is radiated to the compositions extended on the both rolls from the opposite side to the metal rolls, the side contacting with the metal roll is set, the composition partially set is introduced to the gap between both rolls by the rolling of rolls, with both compositions stuck together into a unified sheet, and then they are set completely by radiating with light again.

Partial setting said here refers to the fact that the part contacting with air is not completely set (not finish the setting reaction) and the other part is almost completely set.

In the first method, a roll to contact when setting and a roll to stick together into a unified sheet may be separately arranged to execute the method.

In the second method, two metal rolls are closely arranged, a composition is extended on a roll, light is radiated from the opposite side to the metal roll to set the side contacting with the metal roll, the composition partially set is introduced to the gap between both rolls by the rolling of rolls, the composition is allowed to pass the gap with the unset side contacting with another metal roll, after passing the composition is moved along another metal roll, light is radiated from the opposite side to another metal roll to set the side contacting with the metal roll, and then the composition is completely set by radiating light again.

To shorten the producing time in the above-mentioned methods, the intensity of radiating ultraviolet rays is elevated or a composition having fast setting time is used. Further, a large scope (area) of ultraviolet irradiation and a long time of ultraviolet irradiation to the composition may be used. For instance, a metal roll of a large radius or a metal belt laid over two rolls in place of a single metal roll may be used.

In the invention, since the energy for setting polymerization is light instead of heat, the stop and start are easy and partial setting (different from the above-mentioned partial setting) can be made. In polymerization by heat, the immediate cesation of polymerization is impossible because immediate temperature lowering does not occur even after switching off the heating equipment. Further, with heat, to start, the reaction time is necessary until a specified temperature is reached. In the case of light, these are very smoothly achieved.

Further, also in partial setting by heat, even if a local part is heated, the neibouring parts are heated inevitably, hence the partial setting in the real meaning is impossible. However, in the case of light, by using various shapes of devices for shutting off light (shutting off equipments and printing films), a specific part only can be set.

In the following, a molding method (lamination), that is another form of the invention, is described. Naturally, the same terms represent the same meanings as the above mentioned sheet formation method.

In the invention, a photosensitive composition wherein the setting is prevented in the presence of air is extended on a metal surface, it is subjected to partial setting by radiating light from the opposite side to the metal surface, the unset part of the said first film and the other plastic film (hereinafter referred to as the second film) are stuck together, then it is completely set by radiating light again.

In the following, various terms are described.

A sandwiching roll refers to a cylindrical drum having a metal surface. Thus, since a photosensitive composition is set with extendeding on the metal surface, it is finished very smoothly. That is, the metal surface is a replica in molding the surface. In other words, the metal surface is required to be finished so smoothly as to correspond to the necessary smoothness.

By providing unevenness on the surface of the sandwiching roll or the above-mentioned metal roll, an embossed roll may be prepared.

Further, since the first film is completely set before sticking except a small part of the surface to be stuck together with the second film, the shrinkage due to setting is very small after sticking, hence the lamination of photosensitive composition has been able to be realized.

The extending roll is a roll to extend a photosensitive composition and refers to a roll other than two sandwiching rolls to form an approach position for sticking. It is a metal roll having the same structure and material as the sandwiching roll.

In either case where two extending rolls are also used as a roll for sticking as mentioned in the first method and at the same time with peeling off the partially set film from a metal roll used as an extending roll the unset part of the partially set film is stuck to another roll with turning reversely as mentioned in the second method, if the stress in peeling off the set surface of partially set film from the metal roll is larger, than the adhesive stress with each unset part of two partially set films in the first method or with the unset part of partially set film and the metal roll surface in the second method. Both the partially set films or the partially set film and the metal roll may be again separated with catching foam after passing the approach point. As methods for avoiding such states, release agents may preferably be mixed in appropriate amounts, but more preferably the extending roll and the sticking roll may be arranged separately. Thus, since the partially set film is peeled off in advance, troubles, that two of the partially set films or the partially set film and the metal roll are again separated with catching foam, can be prevented.

In the case of setting by ultraviolet rays, the generation of reaction heat is inevitable, hence a warp or curl may sometimes occurs in complex films because of shrinkage or extension due to the heat. It can be prevented by cooling or warming the metal roll having a temperature regulating function. These are performed by electric heaters, cooling water pipings and cooling fans.

Further, instead of providing the metal roll with such functions, heating or cooling devices can be provided separately.

Thus, by temperature controlling, the difference in shrinkage between a partially set photosensitive composition and the second film is absorbed. Of course, in the case of different shrinkage, the temperature can be so regulated that the temperature difference is generated purposely.

If the second film to be laminated with a photosensitive composition is also a photosensitive composition, it is stuck after its partial setting, then may be set completely.

Further, a thin material may be sandwiched between the first film and the second film. Particularly, when a printed film is sandwiched, a very beautiful plastic film(sheet) can be produced.

A film produced by the invention method is appropriately used in the fields wherein the thickness accuracy and smoothness of the surface are strictly required, for example, as photographic film and magnetic tape.

Further, as the other application examples, the sheet (independent on the presence or absence of a sandwiched material) according to the invention may be used as a sandwiched film for glass. That is, the photosensitive composition is required to include at least one of monomer or oligomer whereby the polymer is swelled with water and the adhesion is promoted in the boundary surface with a sandwiched material.

The sandwiched film for glass refers to a sheet-shape material to put between glass stuck together.

The above mentioned monomer or oligomer whereby the polymer is swelled with water refers to monomers whereby the high polymer has a property of swelling with water.

As such monomers there may be mentioned (not limited to them) 2-hydroxyethyl methacrylate, acrylamide and methoxytetraethyleneglycol methacrylate.

Monomers whereby the polymer is swelled with water are selected because such compounds can be stuck, after setting, to glass by only wetting the surface with water or alcohols (low-molecular, 1~3 hydric alcohols).

As mentioned above, the monomers may be plural types, mixed with other different monomers, or high polymers.

The use method of the sandwiched film for glass of the invention is only for sticking together the glasses having water or alcohols as mediums for sticking on the said sandwiched film for glass.

Further, as the other utilizing method of the molding method of the invention, there is the production of pressure-sensitive adhesive tape wherein the adhesive film to be laminated is a composition having adhesion even after photo-setting.

By the method, the sticking of adhesives to substrates (plastic sheet) is easy.

As the production method, an adhesive (photosensitive composition) is applied to a substrate, then the unset part of the substrate is stuck to the adhesive by only radiating light. Since the adhesive completes the setting reaction, however, with adhesion remaining without solidifying perfectly, it has a performance as adhesive tape. As such compositions keep their adhesion even after completion of the setting reaction, known compositions are utilizable. (U.S. Pat. No. 4,111,769 and U.S. Pat. No. 4,150, 170).

In this case, a release tape may be put along the outside of the said composition.

PREFERRED EMBODIMENT

FIG. 2 is a rough section showing an example of the sheet formation method of the invention. Two of metal rolls (1) are closely arranged. There are provided an upper ultraviolet irradiation device (2) above the metal rolls, a hoper (3) above each metal roll, a lower ultraviolet irradiation device (4) under the rolls, and a pinch roller (5) further under them. The metal roll (1) is chromium-plated, 450 mm in diameter and 300 mm in breadth. The ultraviolet irradiation device has 4 glass tubes of 25 mm in the tube diameter, 330 mm in the tube length and 1.35 W in output power. (fluorescent lamp for copying FL-10BA-37 10W of Matsushita Electric Industry Co., Ltd.).

From the two hoppers (3) a photosensitive composition (6) is supplied and extended on the metal rolls. Since the metal rolls (1) are rolled, each photosensitive composition (6) progresses to a point (7) wherein both metal rolls (1) approach. While the composition progresses from the hopper to the approach point (7), each photosensitive composition is irradiated by the upper ultraviolet irradiation device (2). As described in FIG. 1, setting begins to occur in a certain depth from the surface and the side on the metal surface. Namely, in such degree of time that the setting of the surface is insufficient and the metal surface side is completely set, the photosensitive composition (6) progresses and is introduced to the approach point (7).

The photosensitive composition used in the example is a mixture of 66.6% of urethane acrylate (XP-7000B of Japan Synthetic Chemical Industry Co., Ltd.), 33.3% of hydroxymethacrylate and 0.1% of a photoinitiator.

Since the metal surface side is completely set, the metal side surface is finished to the smoothness of the same degree as the metal surface. Naturally, the metal roll surface is smoothly finished with the accuracy of the degree required. The finishing method may be a usual method, for example, similarly with the metal roll in the above-mentioned solution slavering method.

Thus, the compositions wherein the surface side is unset and the roll side is set are stuck together and the thickness is regulated at the approach point (7) to be unified. This is drawn by the pinch roller (5) and rolled at the downstream side or cut into leaf to be accumulated. Between the metal roll (1) and the pinch roller (5), the internal part of the sheet stuck together is completely set by again radiating ultraviolet rays. In FIG. 2, ultraviolet rays are radiated from both sides, but may be radiated from a half side.

Thus, the sheet (8) is completed. Of course, usual processings to sheets such as a extension and so forth may be conducted freely.

In this method, sheets very smooth in both surfaces can be produced simply that has previously been very difficult to achieve.

Further, by the method, also a laminate structure can be simply obtained by introducing the other film, sheet or other photosensitive composition from above the approach point (7). In this case, also light nontransmitting sheets can be produced that has been impossible with photosensitive resins. Namely, even if sheets existing in the middle do not transmit light at all, it has nothing to do with irradiation above the metal roll (namely, they do not shut off ultraviolet irradiation), hence in the irradiation after sticking together the irradiation from both sides brings about the complete setting of the unset composition.

Further, the other materials such as, for example, powder or particles for providing ornaments or functions, or various forms (lace-shaped materials and specimens of trees, plants or butterfly) can be sandwiched.

Figure 3:
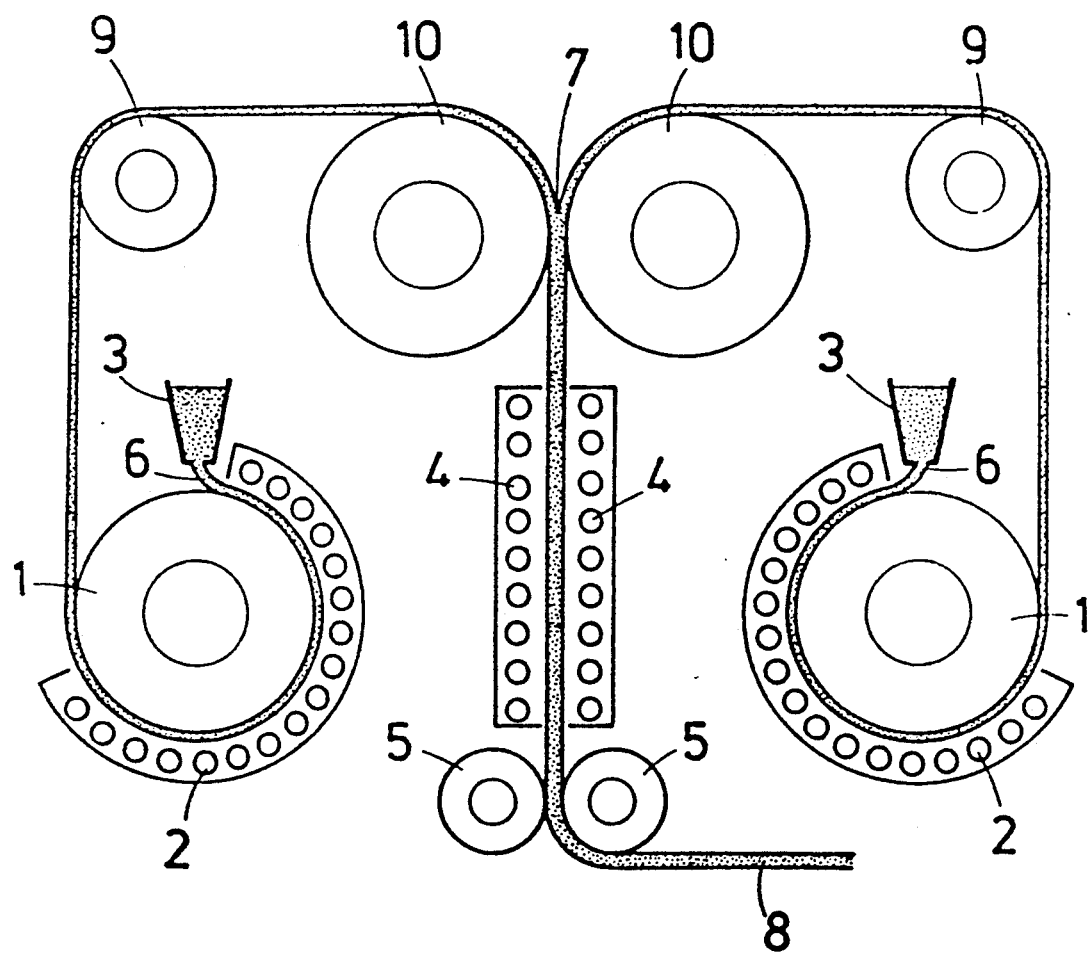
FIG. 3 and FIG. 4 are rough sections showing the other examples of the molding method (sheet formation) of the invention.

FIG. 3 shows conceptually a method wherein two functions of the metal rolls in FIG. 2, that is providing the surface smoothness and sticking to unify into a single sheet, are separated. Metal rolls (10) for sticking to unify are arranged in the center, at the left and right thereof metal rolls (1) to finish a smooth one-side surface are arranged, thereon hoppers (3) and ultraviolet irradiation devices (2) surrounding at least a half circuit of the rolls (1) are arranged and rolls (9) are so arranged at the positions that unset surfaces are not contacted with the rolls. This equipment is so arranged at the positions such that the compositions run from hoppers (3) via metal rolls (1), rolls (9), metal rolls (10) to the last pinch rolls (5).

Thus, besides advantages similar with the example described in FIG. 2 there are additional advantages as follows. In FIG. 2, if a composition used has an affinity to the surface of the metal roll (1) and some stress is required for peeling off, the stress may act as a stress to peel off both composition under the approach point wherein both composition unite. However, in the method as shown in FIG. 3, the peeling off and sticking to unify are not close, hence there is no problem as mentioned above. Further, since the irradiation can be made with a sufficient distance, the productivity can be elevated. As the further advantage, on the way to the metal rolls (10) whereto the partially set composition is introduced, to the unset surface, equipments for partial setting or processes for spraying fine powder of color agents or magnetic materials are can be provided easily.

Figure 4:
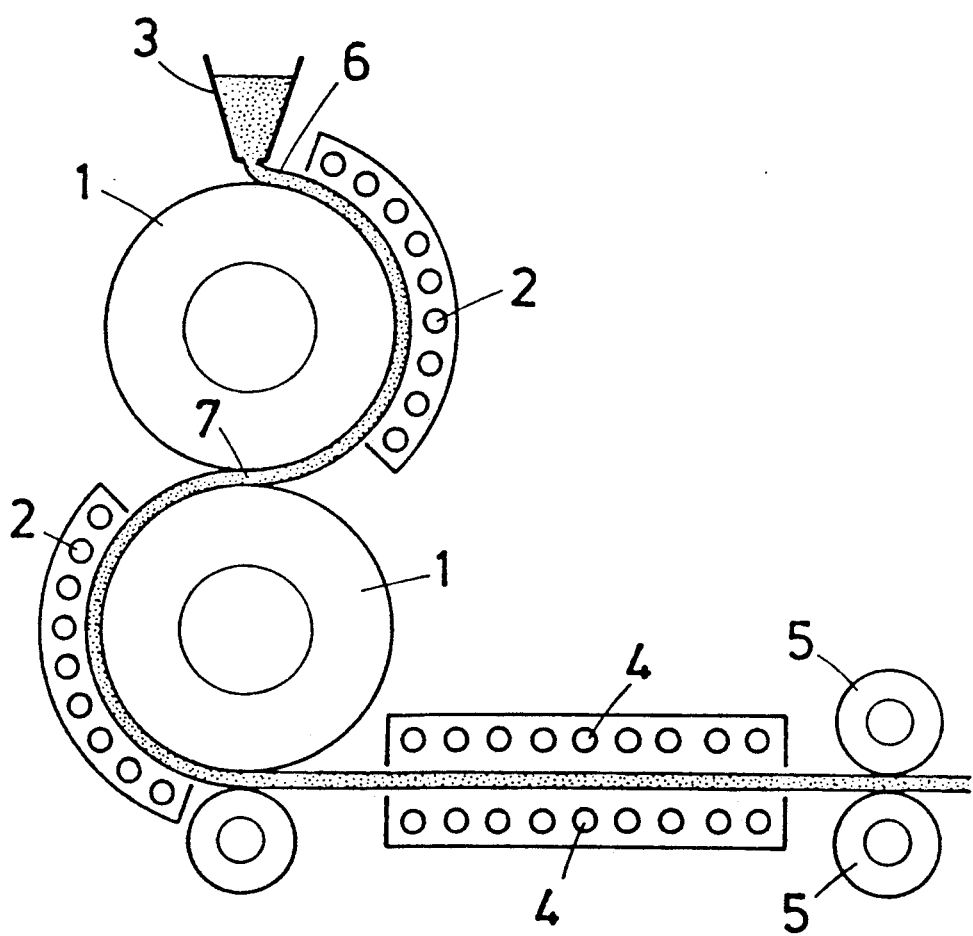

FIG. 4 is a rough section showing another example. In the example, two metal rolls (1) are closely arranged at the upper and lower position, from the top part a composition (6) is extended and introduced to the approach point (7) by rolling the metal rolls (1) in the same manner as the above-mentioned example, and on the way from the introducing point to the approach point (7) ultraviolet rays are radiated to set the metal roll side.

Until here is the same manner as the above-mentioned example, but instead of sticking together here the said sheet-shaped material is set partially and is transferred to the other metal roll, in this time the side contacting with the metal surface is required to be reversed, and the metal roll side is set by radiating ultraviolet rays in the same manner.

Then, the sheet is completely set by again radiating ultraviolet rays on the way to the pinch roller (5). In the example, ultraviolet irradiation is 3 steps.

As mentioned above, the suitable examples for the sheet formation method of the invention were described.

The sheet formation method of the invention has the following unexpected effects.

(1) Sheets of extremely high surface smoothness can be produced.

(2) The production equipment itself is very simple and a low cost.

(3) Since solvents are unnecessary, there is no danger to human body and no danger of fire.

(4) Since the recovery of solvents is unnecessary, the whole equipment is compact.

(5) On.off of polymerization or partial polymerization (setting) can be simply conducted.

(6) There are a large number of types of photosensitive compositions, and various compositions can be selected to obtain properties satisfying needs.

(7) Since high temperature and solvent are not used, laminate processing can be conducted with materials apt to be damaged by high temperature or solvent.

(8) Exclusive equipment is not required, and if compositions are changed, the operation can be conducted with simple adjustment. Since usual extrusion molding machines and equipment for the solution slavering method are exclusive equipment, resins cannot be simply changed.

In the following, suitable examples for the laminate method of the invention are described with drawings.

Figure 5:
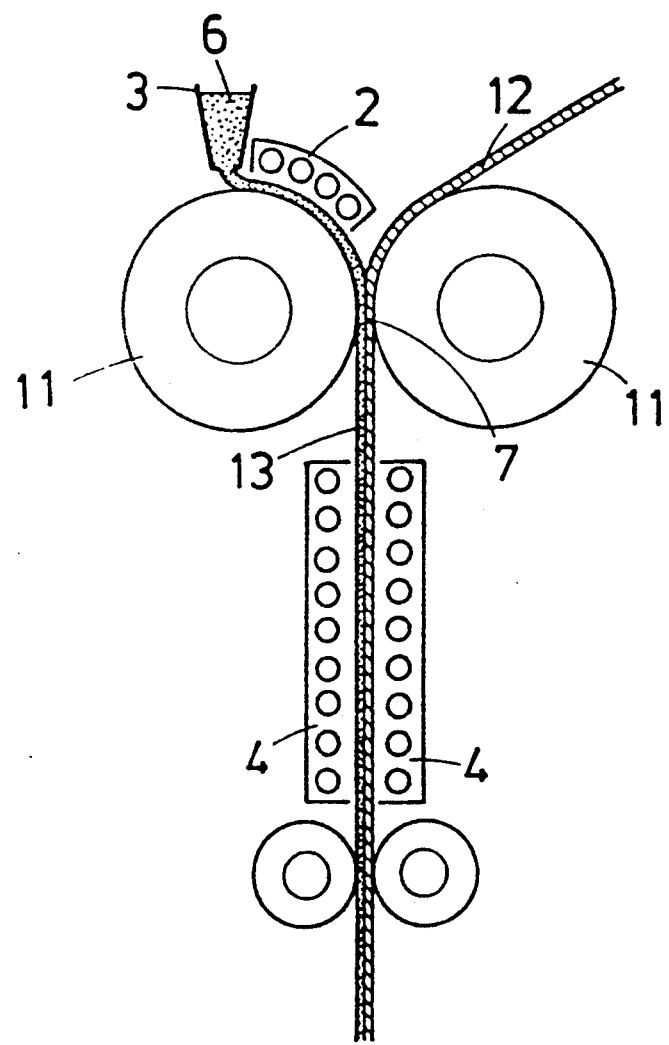
FIG. 5 is a rough section showing an example of the molding method (laminate) of the invention.

FIG. 5 is a rough section showing an example of the invention method. Two sandwiching rolls (11) are closely arranged, above one of the roll a hopper (3) and an upper ultraviolet irradiation device (2) are provided. A point (7) of both rolls by rolling of the roll. On the way to n the approach point (7) ultraviolet rays are radiated by the upper ultraviolet irradiation device (2), and the part excepting atmospheric side surface of the said composition is set. Then, at the said approach point (7) the composition is stuck by pressure together with the second film (12). Ultraviolet rays are radiated to the laminate film (13) by a lower ultraviolet irradiation device (4) arranged at the lower position to set completely the photosensitive composition. Thus, the laminate is complete. In this example, as the second film a transparent film of polyester is used, but a nontransparent or partially transparent film may be usable. In the case, however, the lower ultraviolet irradiation device is not required to radiate from the second film (12) side.

Figure 6:
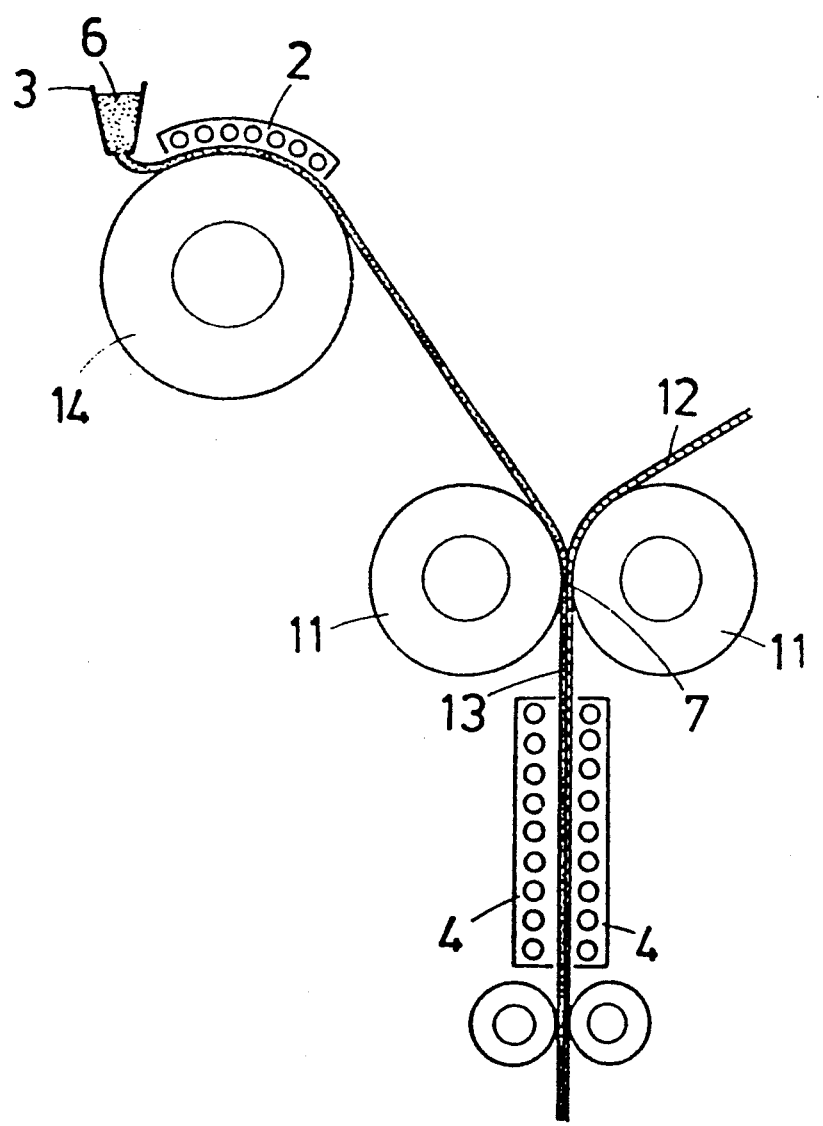
FIG. 6, FIG. 7, FIG. 8, FIG. 9 and FIG. 10 are rough sections showing the other examples of the molding method (laminate) of the invention.

The example in FIG. 6 is the same as FIG. 5 as a equipment except that the hopper (3) for a photosensitive composition is arranged above the extending roll (14).

The production method is the same as FIG. 5, but the photosensitive composition set partially is introduced to the sandwiching roll (11), with a certain distance and time from the extending roll (14), hence it has the same effect as FIG. 3. That is the problem of peeling off stress. In the example, the extending roll (14) is provided above the sandwiching roll (11), but the extending roll may be provided at the more lower position with a direction changing roll at the middle position. In the example, the extending roll (14) may be fitted with a cooler (abbreviated in FIG. 6) to absorb the reaction heat. To absorb the reaction heat in sticking in the same manner, the sandwiching roll (11) may be also fitted with a cooler. Thus, even if the second film or thin materials is sensitive to heat, the method can be performed. Since heat is unnecessary for adhesion and reaction heat, it is dispensable, which is different from the above-mentioned hot-melt method.

Figure 7:
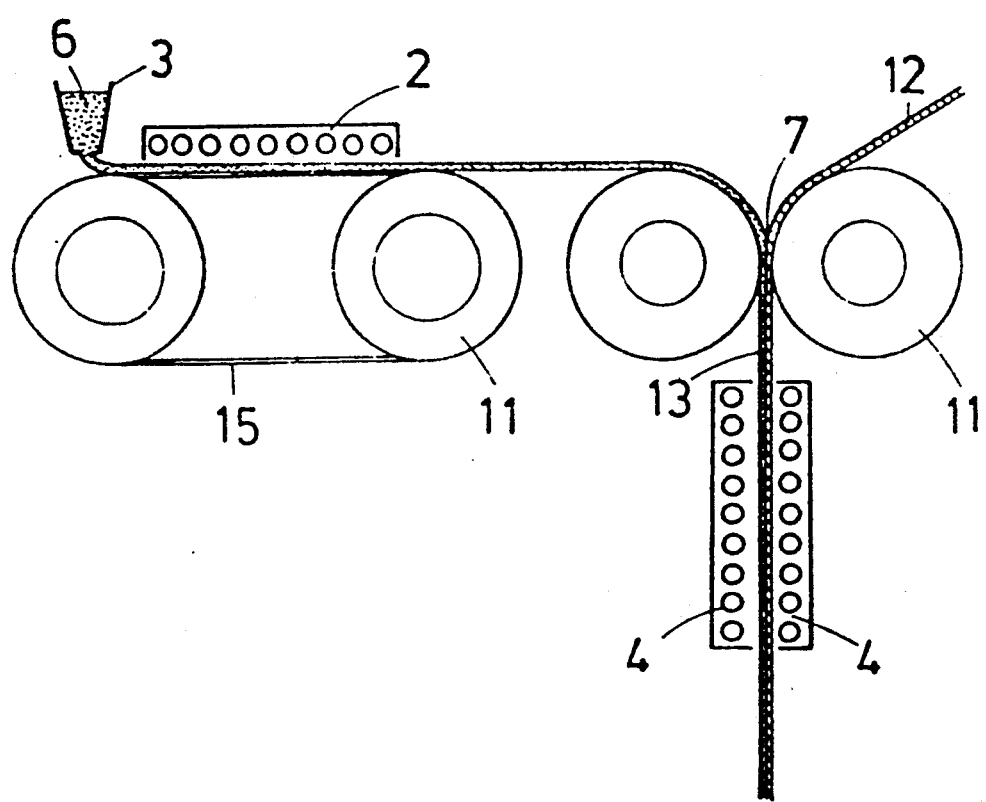

The example shown in FIG. 7 is almost the same as FIG. 6, but is different in that another roll is provided between the extending roll (14) and the sandwiching rolls (11) and the said roll and the extending roll is connected with a metal belt (15). In this case, since the radiation of ultraviolet rays is made over the metal belt, a long radiation time is permitted and no dropping of partial setting materials due to gravity occurs. Further, since the relation between the sandwiching rolls (11) and extending roll (14) is cut, there is no problem concerning peeling off.

Figure 8:
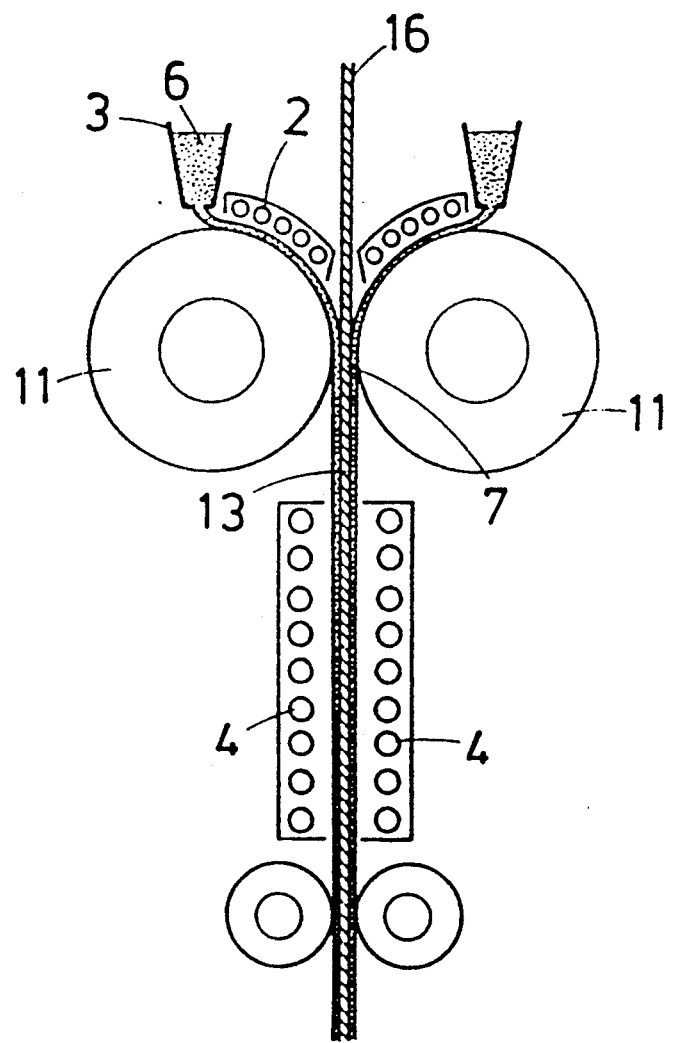

The example shown in FIG. 8 is the same equipment as FIG. 5 except that the hopper (3) of a photosensitive composition is provided over the both sandwiching rolls (11).

The production method is the same as that in FIG. 5. Two films of the partially set photosensitive compositions are so introduced to the approach point (7) that a thin material (16) is sandwiched, then after sticking by pressure the compositions are completely set by the lower ultraviolet irradiation device (4). In this case, the thin material (16) either transparent or opaque may be used. In the case of the example, a complex film of very high smoothness in both surfaces is obtained, being different from the example shown in FIG. 5. Of course, photosensitive compositions can be used in both sides of film also in examples in FIG. 6 and FIG. 7.

Figure 9:
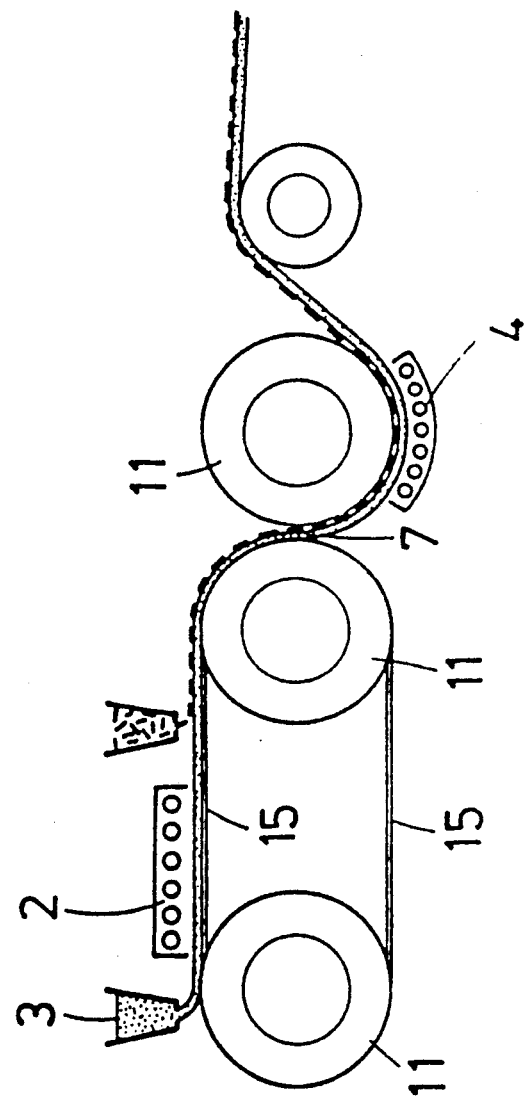

In the example shown in FIG. 9, an uncontinuous thin material is sandwiched. In this example, bamboo blades are used as the thin material. It is one of the important features of the invention that even such an uncontinuous material sensitive to heat can easily be laminated.

Figure 10:
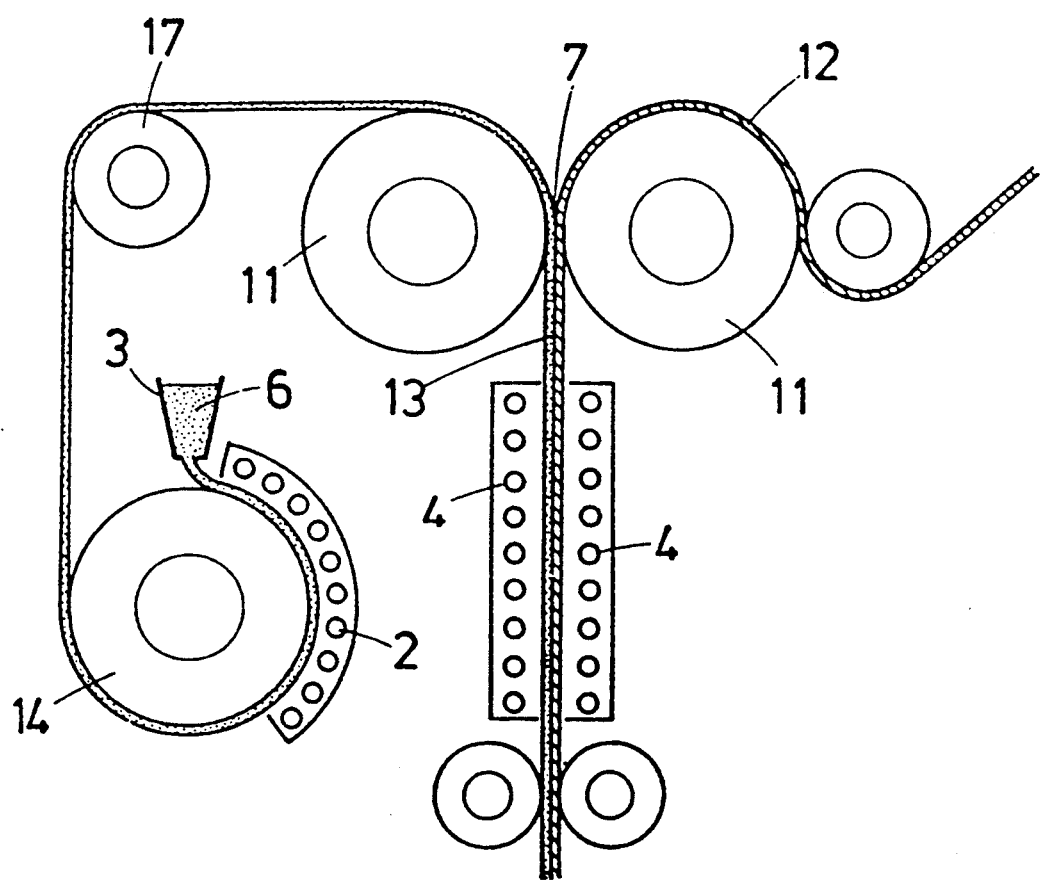

In the example shown in FIG. 10, a direction changing roll (17) is provided between the extending roll (14) and the sandwiching rolls (11), all of the rolls shown in the drawing are capable of changing freely the sending speed individually and also in the two sandwiching rolls (11) the temperature can be regulated separately.

In this example, a long irradiation time of ultraviolet rays is permitted on the extending roll (14), the first setting is apart largely from the sticking in the time and distance and the speed can freely be changed, hence the effect of the shrinkage owing to the first setting on the sticking part is little. Since the temperature of sandwiching rolls (11) can, in addition, be regulated separately, the occurrence of warp and curl can be remarkably decreased.

Figure 11:
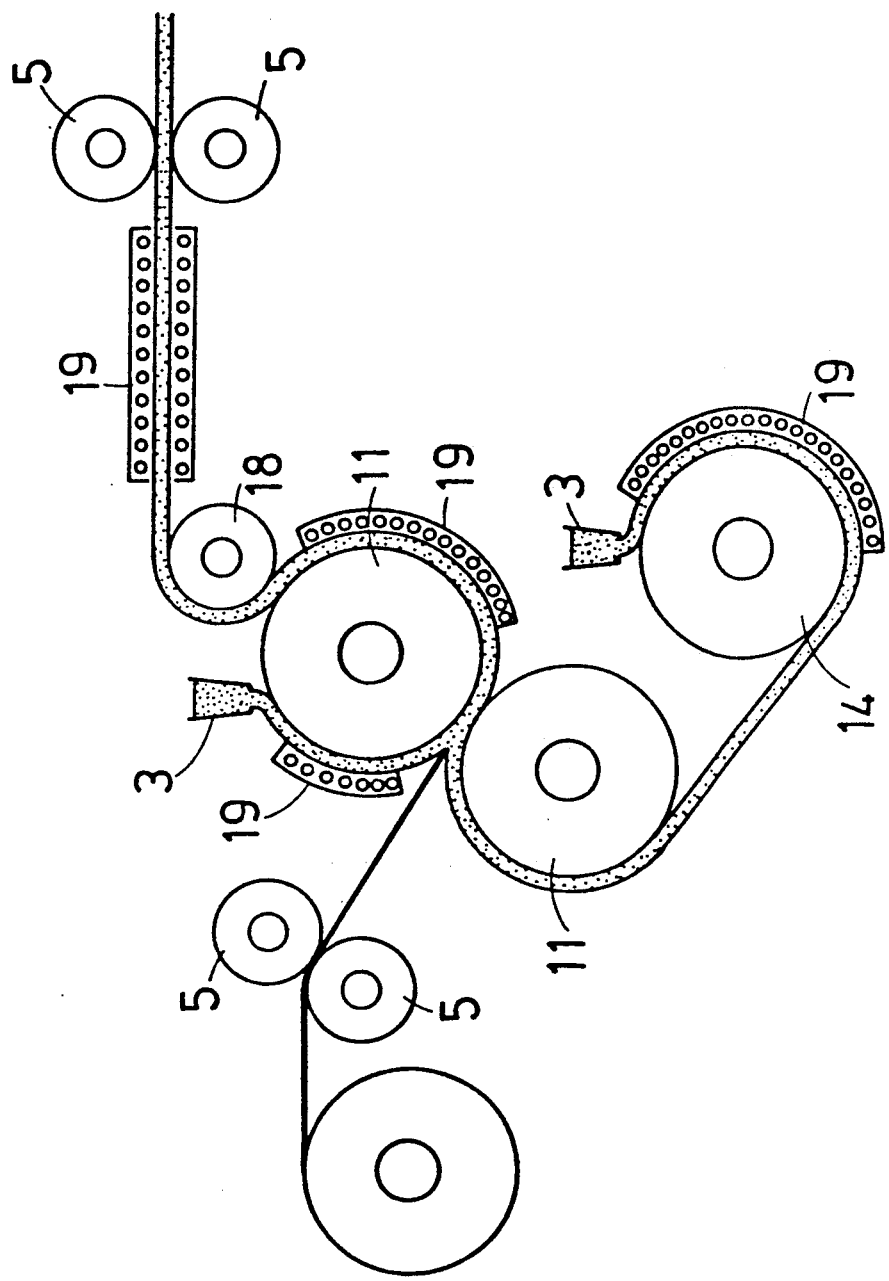
FIG. 11 is a rough section showing rolls arrangement wherein various molding methods of the invention can be executed.

In the equipment shown in FIG. 11, an extending roll (14), sandwiching rolls (11), hoppers (3), pinch rolls (5), a pressing roll (18) and ultraviolet irradiation devices (19) are arranged in the position as shown in the drawing.

In the equipment, all the following methods can be operated, which are the method for sticking two partially set films (FIG. 2 and FIG. 3, the method for sheet formation with a partially sets film (FIG. 4), the method for sticking a partially set film to another film (FIG. 5, FIG. 6, FIG. 7 and FIG. 10) and the method for inserting a sandwiched material between two partially set films (FIG. 8).

According to each method, stopping the inserted film or stopping another photosensitive composition may be made easily.

The laminate method mentioned above has remarkable effects as follows.

(1) Complex films can be produced easily.

(2) Complex films having surfaces of very high smoothness can be obtained, hence the smoothness can be elevated to the accuracy which could not be obtained with the former laminate sheet or laminate film.

(3) Since the setting reaction is mostly completed before sticking, laminates utilizing photosensitive compositions, which could not be laminated hitherto because of the too large shrinkage (5~30%), can be obtained.

(4) Since even materials low in heat resistance can be laminated, the types of films able to be laminated increase.

(5) The reaction can be progressed with regulating the temperature, and the laminates of high accuracy with a very little curl or warp, in sticking, can be produced.

(6) The change of materials is easy almost without useless material and time, that is different from the conventional laminate method. Hitherto, there have been a waste of materials remaining in equipments and losses in the time and heat such as in reheating equipment after cooling.

(7) Since also incontinuous materials can be simply laminated, complex sheets and complex films having beautiful appearances not obtained hitherto can be obtained.

(8) The equipment itself is simple, and the need for a whole chamber in a special atmosphere or solvent evaporation is not required at all, leading to a low cost and safety.

As mentioned above, the present invention is very useful.

I claim:

1. A method for molding a photosensitive composition which comprises extending the photosensitive composition on a metal surface, setting the side contacting with the metal surface by radiating light from the opposite side to the metal side, producing a film with excellent smoothness by curing at the time the photosensitive composition is in contact with the metal surface because that portion of the composition is out of contact with air when in contact with the metal surface, then setting completely the unset part of the photosensitive composition in contact with a surface in the absence of air by radiating light.

2. The method for molding photosensitive compositions defined by claim 1 which comprises arranging two metal rolls closely, extending the photosensitive compositions on the metal rolls, setting the sides contacting with the metal rolls by radiating light to the compositions extended on both rolls from the opposite sides to the metal rolls, introducing the compositions set partially to the gap between the rolls by rolling of the rolls, sticking together both compositions into a unified sheet, then setting completely by radiating light.

3. The method for molding photosensitive compositions defined by claim 2 which comprises arranging two additional metal rolls closely, at the left and right of the said rolls at the center, setting the side contacting with the metal rolls by radiating light to the compositions extended on both rolls from the opposite side to the metal rolls, then peeling off each composition from the metal roll surface with the rolling of rolls, introducing each composition between the two additional metal rolls closely arranged in the center guide rolls, sticking together both compositions into the unified sheet, then setting completely by radiating light.

4. The method for molding photosensitive composition defined by claim 1 which comprises arranging two metal rolls closely, on one of the rolls, extending photosensitive composition setting the side contacting with the metal roll by radiating light from the opposite side to the metal roll, introducing composition set partially to gap between both rolls by rolling of the rolls, passing the gap so that the unset side contacts with said another metal roll, then setting the side contacting with said another metal roll by radiating light from the opposite side to another metal roll.

5. A method for molding plastic film which comprises extending a first film of a composition wherein the setting is retarded in the presence of air on a metal surface, setting partially by radiating light from the opposite side to the metal surface, sticking the unset part of the said first film 6. The method for molding plastic film defined by claim 5 which comprises arranging at least two metal sandwiching rolls, extending the first film on a first sandwiching roll, introducing the first film which is set on the side contacting with the roll to the photosensitive composition from the opposite side to the sandwiching roll to the other sandwiching roll and sticking together the first film with the second film between the sandwiching roll.

7. The method for molding plastic film defined by claim 5 which comprises arranging two sandwiching rolls closely, arranging a metal extending roll with a distance from the said rolls, extending a photosensitive composition wherein the setting is prevented in the presence of air on the said extending roll, introducing it to the above sandwiching rolls and sticking together with the second film at the approach point of the sandwiching rolls.

8. The method for molding plastic film defined by claim 7 which comprises laying a metal belt between the sandwiching rolls and extending roll or laying a metal belt on another roll arranged separately between the sandwiching rolls and the extending roll.

9. The method for molding plastic film defined by claim 6, wherein at least one of various rolls is capable of regulating temperature.

10. The method for molding plastic film defined by claim 6, wherein temperature regulating devices are provided separately except rolls.

11. The method for molding plastic film defined by claim 6 wherein the second film is also prepared by extending a photosensitive composition wherein the setting is prevented in the presence of air on a metal surface and by setting partially by radiating light from the opposite side to the metal surface.

12. The method for molding plastic film defined by claim 11 wherein the other thin material is sandwiched between the first film and the second film.

13. The method for molding plastic film defined by claim 12 wherein the thin material is a plastic film.

14. The method for molding plastic film defined by claim 7, wherein at least one of various rolls is capable of regulating temperature.

15. The method for molding plastic film defined by claim 8 wherein at least one of various rolls is capable of regulating temperature.

16. The method for molding plastic film defined by claim 7 wherein temperature regulating devices are provided separately except rolls.

17. The method for molding plastic film defined by claim 8 wherein temperature regulating devices are provided separately except rolls.

18. The method for molding plastic film defined by claim 7 wherein the second film is also prepared by extending a photosensitive composition wherein the setting is prevented in the presence of air on a metal surface and by setting partially by radiating light from the opposite side to the metal surface.

* * * * *